(12) United States Patent
Rucks et al.

(10) Patent No.: US 6,422,762 B1
(45) Date of Patent: Jul. 23, 2002

(54) OPTICAL CONNECTION UNIT

(75) Inventors: Michael Rucks, Schwerte; Achim Mihm, Wuppertal, both of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/314,760

(22) Filed: May 19, 1999

(30) Foreign Application Priority Data

Jun. 12, 1998 (DE) .......................................... 198 26 275

(51) Int. Cl.⁷ ................................................. G02B 6/36
(52) U.S. Cl. .......................................... 385/76; 385/15
(58) Field of Search ................................ 385/9, 25, 15, 385/53–54, 55, 70–75, 76, 77, 78, 27

(56) References Cited

U.S. PATENT DOCUMENTS

| | | | |
|---|---|---|---|
| 4,045,121 A | 8/1977 | Clark | |
| 4,212,514 A | * 7/1980 | Prunier et al. | ........... 350/96.21 |
| 4,218,113 A | 8/1980 | Uberbacher | |
| 5,134,676 A | 7/1992 | Boillot | |
| 5,230,032 A | 7/1993 | Muzslay | |

FOREIGN PATENT DOCUMENTS

| | | |
|---|---|---|
| DE | 2622607 C3 | 9/1981 |
| DE | 2518319 C2 | 11/1981 |
| DE | 3408840 A1 | 9/1984 |
| DE | 3902411 | 2/1990 |
| DE | 4446328 A1 | 8/1995 |
| EP | 0559147 A1 | 9/1993 |
| JP | 55009535 | 8/1980 |

* cited by examiner

Primary Examiner—Frank G. Font
Assistant Examiner—Michael P Mooney
(74) Attorney, Agent, or Firm—Thomas N. Twomey

(57) ABSTRACT

An optical connection unit for the optically conducting connection of optical elements which conduct, receive or emit light is described. The optical connection unit comprises an optical transmission element which has at least one coupling surface for the optical coupling on at a coupling surface of one of the optical elements. Furthermore, the optical transmission element is designed as a spring element so that the coupling surface of the transmission element can be subjected to a bias force in the direction of the coupling surface of the optical element.

19 Claims, 3 Drawing Sheets

OPTICAL CONNECTION UNIT

TECHNICAL FIELD

The present invention relates to an optical connection unit for the optically conducting connection of light conducting, receiving and/or emitting optical elements. The apparatus is further directed to the use of an optical connection unit of this kind in an optical network.

BACKGROUND OF THE INVENTION

Optical connection units of this kind are always required when optical signals are to be transmitted from one place to another place. In this the optical signals can be data signals, i.e. signals carrying certain information to be evaluated, and in this in particular digital data signals. The optical signals can however also be simple light signals without a special information content, such as are used for example for lighting.

In order to be able to ensure as low an intensity loss in the transmission of the optical signals as possible, the optical coupling between the connection locations of different conduction sections which are present in the light transmission path must be designed as loss-free as possible. For this it is required that the cooperating coupling surfaces of two line sections which border on one another lie directly in contact, i.e. without a spacing.

In known connection units the corresponding optical elements, for example plugs and associated coupling, must either be manufactured with correspondingly high precision; or in each case the elements to be coupled to one another are drawn together by spring elements gripping on the respective housings of these elements in such a manner that the coupling surfaces of the two optical elements lie in contact with one another.

The first of these solutions has the disadvantage that it places high requirements on the manufacture of the parts used and is thus correspondingly expensive. Disadvantageous in the second solution given is that the coupling surfaces of the optical elements which lie in contact with one another can be moved apart for example through an inadvertent pulling at the light conductors counter to the spring force holding the elements together, through which the optical damping increases abruptly or, respectively, in the worst case the optical coupling is completely interrupted.

A further disadvantage consists in that for example in a connection of two or more light conductors via a common node element or in the connection of one or more light conductors to an emitter or receiver element for example via a mixer, i.e. an optical distributor or an optical collector unit, in each case separate spring elements must be provided in each case at all contact locations of the node element or the mixer respectively, at least however at its input and at its output side. Through this the costs for corresponding connection units are further increased.

SUMMARY OF THE INVENTION

An object of the invention is to design an optical connection unit of the initially named kind in such a manner that a simple and in this at the same time a reliable optical connection between light conducting, receiving and/or emitting optical elements is possible, with it being desirable that the damping of the optical connection remain a minimum even in the event of mechanical stressing.

In accordance with the invention this object is satisfied by an optical connection unit for the optically conducting connection of optical elements which conduct, receive and/or emit light comprising an optical transmission element which has at least one coupling surface for the optical coupling on at a coupling surface of one of the optical elements and which is designed as a spring element so that the coupling surface of the transmission element can be subjected to a bias force in the direction of the coupling surface of the optical element.

In accordance with the invention, thus, the optical transmission element is itself designed as a spring element so that the coupling surfaces of the optical transmission element and of the optical elements to be coupled to the optical connection unit are pressed against one another directly by the spring bias force which is produced by the optical transmission element. Because the coupling surface of the transmission element can be subjected to a bias force in the direction of the coupling surface of the optical element, it is ensured that in the event of an inadvertent pulling apart of the transmission element and the coupled on optical element, for example through a mechanical stressing, the coupling surface of the transmission element follows the movement of the optical element as a result of the innate bias tension of the transmission element so that a moving apart of the two coupling surfaces, which lie in contact with one another, is prevented. An increase in the damping between the optical elements which are connected to one another or an interruption of the optical connection is thus reliably prevented, at least up to a certain maximum displacement of the coupling surface of the optical element.

In accordance with a further preferred embodiment of the invention the transmission element has at least two coupling surfaces for the coupling on at the optical elements. In this way for example two or more light conductors can be very simply connected to one another. It is in principle however also possible that the transmission element has only one specially designed coupling surface for the coupling on for example at a light emitting signal source and that the light which is coupled into the transmission element in this way is conducted via a light conductor which is designed in a single piece with the connection unit to a destination and is for example radiated off there for the display of a certain information. It is furthermore possible that the transmission element has more than two coupling surfaces so that a large number of optical elements can be connected to one another via a single optical connection unit.

In accordance with a further preferred embodiment of the invention the transmission element comprises a flexible, in particular elastic light conductor, in particular a plastic or glass fiber cable. In this the coupling surfaces are advantageously formed by the end surfaces of the light conductor.

In this way a very simple and economical embodiment of an optical connection unit is possible, with both end surfaces of the light conductor being used when the optical connection unit is used for the connection of a plurality of optical elements. It is however also possible that the light conductor which forms the transmission element is merely the end of a longer light conductor so that the optical connection unit is formed in a single piece with this longer light conductor. In this case a further optical element can be connected directly to the longer light conductor via the integrally formed optical connection unit. In the execution of the light conductor of an elastic material the spring effect can be achieved directly through deformation, in particular through a lateral bending out of the light conductor.

In accordance with a further embodiment of the invention elastic elements, in particular elastic material are provided laterally to the light conductor through which the light conductor is held substantially in a predetermined shape. The optical transmission element is in this case formed by the combination of the light conductor and the elastic elements. The light conductor is preferably at least regionwise surrounded by elastic material. In this embodiment the execution of the transmission element as a spring element is achieved through the additional elastic elements. The light conductor is embedded with respect to the elastic elements or, respectively, in the elastic material, or at least surrounded at a predetermined distance by the latter, in such a manner that a lateral deformation, for example a bending, of the light conductor also produces a deformation of the elastic elements or, respectively, of the elastic material. Through the thus arising restoring forces within the elastic elements or, respectively, of the elastic material it is ensured that the coupling surface or the coupling surfaces respectively of the light conductor are subjected to a bias force in the direction of their respective initial position, which corresponds to the relaxed position. In principle it is also possible to manufacture the light conductor of an elastic material as well so that the functionality of a spring element is achieved through a combination of an elastic light conductor with an elastic material surrounding the latter.

The light conductor is preferably arranged in a housing, with at least one section, in particular an end of the light conductor, being led to the outside through an opening which is formed in the housing, and with this section of the light conductor which protrudes to the outside being moved in the direction towards the interior of the housing when the transmission element is subjected to a bias force. Preferably two sections, in particular the two ends of the light conductor, are led to the outside through the housing wall and are movable.

Through this embodiment it is achieved that in the relaxed state the end section or the end sections of the light conductor respectively which carry the coupling surface protrude to a maximum extent out of the housing so that the coupling surface of the optical element which is to be connected with the connection unit can be placed on the coupling surface which protrudes from the housing. If the optical elements are moved further in the direction of the housing after the contacting has been completed, then the light conductor is deformed within the housing against the spring bias force so that the respective coupling surfaces lie in contact with one another under the action of a bias force. Through this a reliable and damping-poor connection is ensured. The bias force of the transmission element is thus automatically produced in this embodiment by the application and the fixing of the respective optical element at the optical connection unit.

In accordance with a further advantageous embodiment of the invention an actuation member is provided at the housing for the biasing of the transmission element. In this embodiment it is thus possible to effect the biasing of the transmission element for example through the bending of the light conductor via a push-button which is provided at the housing and which acts laterally on the light conductor. This can for example be appropriate when the optical connection unit is to be inserted into a larger constructional unit and the ends of the light conductor which protrude out of the housing in the relaxed state would be disturbing during the insertion of the optical connection unit into the constructional unit.

For example an opto-electrical element which is fixed at a conductor plate and, at a certain distance from it, the end of a single light conductor or a light conductor bundle which is fastened to the constructional unit can be provided in the constructional unit which are to be connected via an optical connection unit which is designed in accordance with the invention. Prior to the insertion of the connection unit the optical transmission element can be subjected to a bias force through the actuation of the push-button, with the ends of the light conductor being retracted. In this state the connection unit can be inserted into the region between the opto-electrical element and the end of the light conductor or of the light conductor bundle respectively, whereupon the push-button is released. As a result of the bias force of the optical transmission element its ends are displaced outwardly so that they come to lie in contact under stress at the coupling surfaces of the opto-electrical element and of the light conductor or of the light conductor bundle respectively.

Further advantageous embodiments of the invention are set forth in the subordinate claims.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
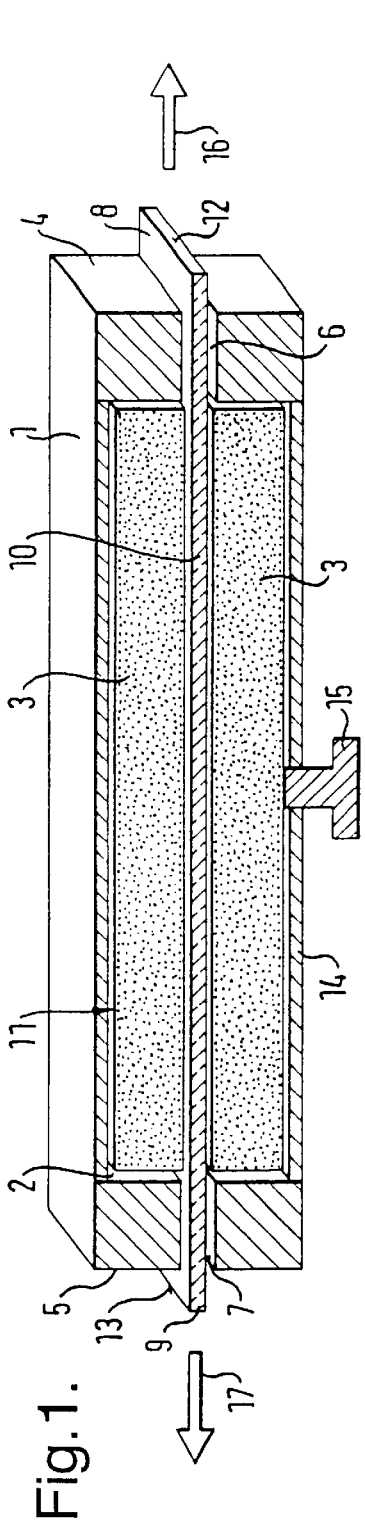
FIG. 1 is a schematic partially sectioned perspective illustration of an optical connection unit which is designed in accordance with the invention.

The optical connection unit which is illustrated in FIG. 1 comprises a housing 1 with an internally lying cavity 2 which is filled in with elastic material 3, for example with an elastomer, a silicone or the like.

The housing 1 has openings 6, 7 at its oppositely lying end sides 4, 5 through which the free ends 8, 9 of a light conductor 10 protrude outwardly.

The light conductor 10 extends over the entire length of the housing 1, through the latter and through the elastic material 3 so that elastic material 3 is present both above as well as below the light conductor 10.

Together with the elastic material 3 the light conductor 10 forms an optical transmission element 11, with the end sides of the light conductor 10 which are arranged at the free ends 8, 9 being designed as coupling surfaces 12, 13 for the optical coupling on at light conducting, receiving and/or emitting optical elements.

A push-button 15 is provided in a side wall 14 of the housing 1 via which the elastic material 3 can be stressed by a force substantially perpendicular to the light conductor 10.

The force imparted via the push-button 15 to the elastic material 3 which is arranged below the light conductor 10 is transferred to the light conductor 10 and via the latter to the elastic material 3 which is arranged above the light conductor 10 so that when the push-button 15 is actuated the light conductor 10 takes on a shape which is curved upwardly in FIG. 1. Through this the free ends 8, 9 and thus also the coupling surfaces 12, 13 of the light conductor 10 are at the same time moved in the direction towards the interior of the housing 1. The mechanical bias force impressed in this way on the optical transmission element 11 consisting of the light conductor 10 and the elastic material 3 causes the coupling surfaces 12, 13 to be subjected to a bias force in the direction of the arrows 16, 17.

Figure 2:
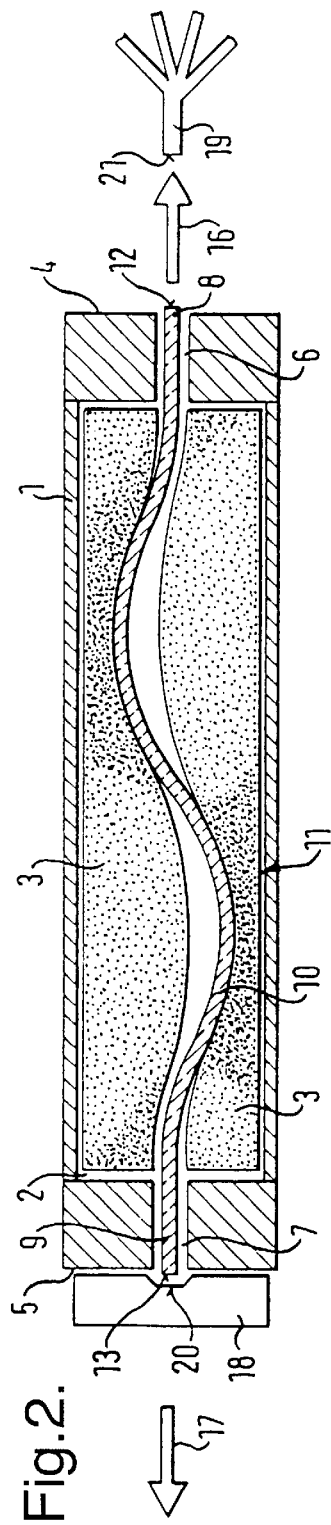
FIG. 2 is a further embodiment of an optical connection unit in accordance with the invention in a sectional illustration.

FIG. 2 shows the optical connection unit in accordance with FIG. 1 without the push-button 15. In this the optical transmission element 11 is illustrated in its biased position in which the light conductor 11 has an S-shaped form and the elastic material 3 has corresponding compressed and relaxed regions.

The shape of the light conductor 10 illustrated in FIG. 2 can for example be achieved in that the coupling surfaces 12, 13 of the light conductor 10 are urged in the axial direction with a force which is directed towards the interior of the housing 1, through which the light conductor 10 is compressed.

In contrast to the relaxed position of the light conductor 10 illustrated in FIG. 1 the coupling surfaces 12, 13 in the biased position illustrated in FIG. 2 are shifted closer together, with typical values for the distance between the coupling surfaces 12, 13 in the relaxed state being for example between 60 and 100 mm, in particular approximately 80 mm, and in the biased state in each case values which are decreased by for example between 1 and 5 mm, in particular by approximately 2 mm. Typical values for the maximum lateral deflection in the deformation of the light conductor are between 3 and 20 mm, in particular approximately 8 mm.

In FIG. 2 optical elements 18, 19 are schematically illustrated in addition to the optical connection unit, with the optical element 18 for example representing anelectro-optical element which is designed for the emission and/or reception of light signals, whereas the optical element 19 represents an optical mixer element by means of which light signals can be distributed and/or brought together. In principle it is possible to connect any desired kinds of light conducting, receiving and/or emitting optical elements to one another with the connection unit designed in accordance with the invention.

The optical element 18 has a coupling surface 20 which is designed for the coupling on at the coupling surface 13 of the light conductor 10.

In the same way the optical element 19 has a coupling surface 21 which is designed for the coupling on at the coupling surface 12 of the light conductor 10.

The optical elements 18, 19 are in each case placed at the end sides 5, 4 of the housing 1 in such a manner that the coupling surfaces 13 and 20 and, respectively, 12 and 21 lie really in contact with one another. Then the optical elements 18, 19 are moved further in the direction of the housing contrary to the arrows 16, 17 that the light conductor 10 is brought into the biased position illustrated in FIG. 2. Through the partially compressed elastic material 3 the coupling surfaces 12, 13 of the light conductor 10 are thus biased outwardly in the direction of the arrows 16, 17 and are thus pressed against the coupling surfaces 20, 21 of the optical elements 18, 19. In this way a reliable coupling on of the optical elements 18, 19 to the light conductor 10 is achieved.

The optical elements 18, 19 can in this be connected in the usual way to the optical connection unit, in particular to the housing 1, in order to produce a mechanically stable connection. For example the optical elements 18, 19 can be screwed, latched or for example fastened to the housing 1 by means of a clamp, bayonet, or bracket lock.

Figure 3:
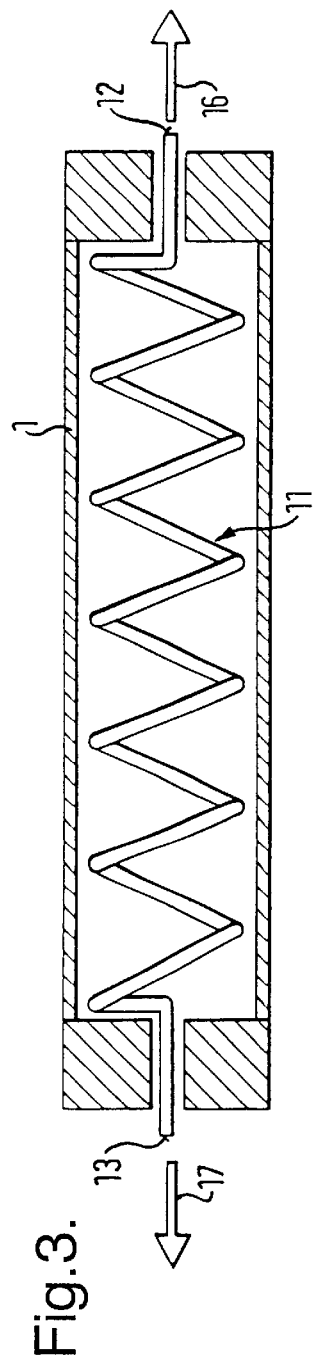
FIG. 3 is a schematic substitute circuit diagram for the explanation of the function of a connection unit which is designed in accordance with the invention.

FIG. 3 shows schematically the fundamental principle of the invention. It can be recognized that the optical transmission element 11 which is formed of the elastic material 3 and the light conductor 10 immediately has the function of a spring element so that when the optical transmission element 11 is subjected to a bias force the coupling surfaces 12, 13 are biased in the direction of the arrows 16, 17. If for example one of the optical elements 18, 19 or both of the optical elements 18, 19 are inadvertently moved in the direction of the arrows 16, 17 through mechanical stressing, then the coupling surfaces 12 and 21 or 13 and 20 respectively which respectively lie in contact with one another are not separated from one another, but rather the coupling surfaces 12, 13 of the light conductor 10 follow the movement of the optical elements 18 and/or 19 as a result of the biasing of the transmission element 11. Thus a reliable optical connection between the optical connection unit 10 and the optical elements 18 and 19 also remains ensured within the framework of the maximum bias when the optical elements 18, 19 are moved.

Figure 4:
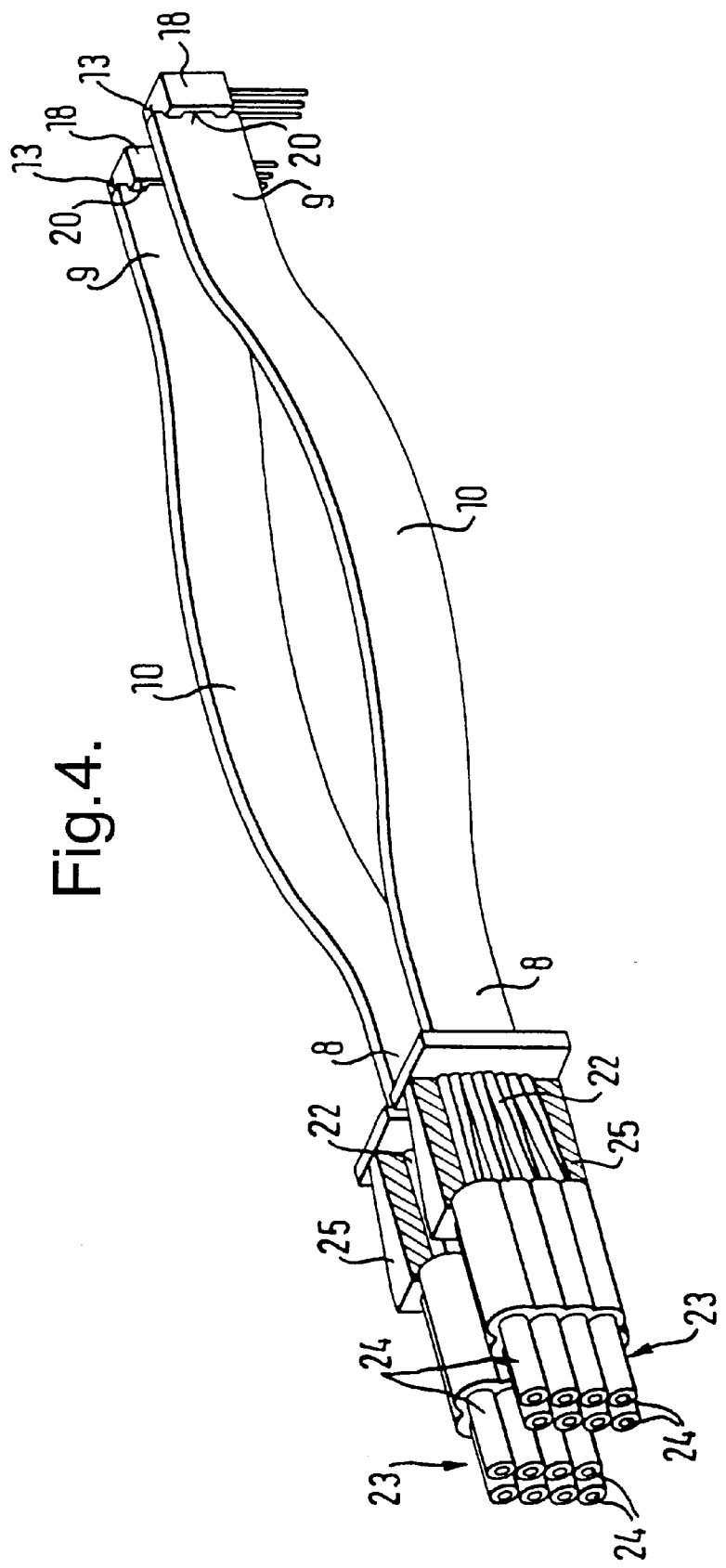
FIG. 4 is a partially torn open, perspective illustration of an optical connection unit in accordance with the invention.

In FIG. 4 an optical connection unit which is designed in accordance with the invention with two flexible light conductors 10 is illustrated. In this, for the sake of simplicity of the illustration, the housing and elastic material which is possibly present is not shown.

Whereas in each case the coupling surfaces 13 which are formed at the free ends 9 of the light conductor 10 lie in contact at corresponding coupling surfaces 20 of two optoelectrical elements 18, ends 22 of light conductor bundles 23 are coupled on at the free ends 8 of the light conductor 10 in each case. The light conductor bundles 23 consist in each case of eight light conductors 24, of which in each case four are arranged to lie one above the other in a row. The eight light conductors 24 are brought together in a guide block 25, which is shown in a cut away illustration, in such a manner that their ends come to lie one above the other in a single line. In this way the ends of the light conductors 24 can be coupled directly on at the coupling surface 12 of the band-shaped light conductor 10.

Figure 5:
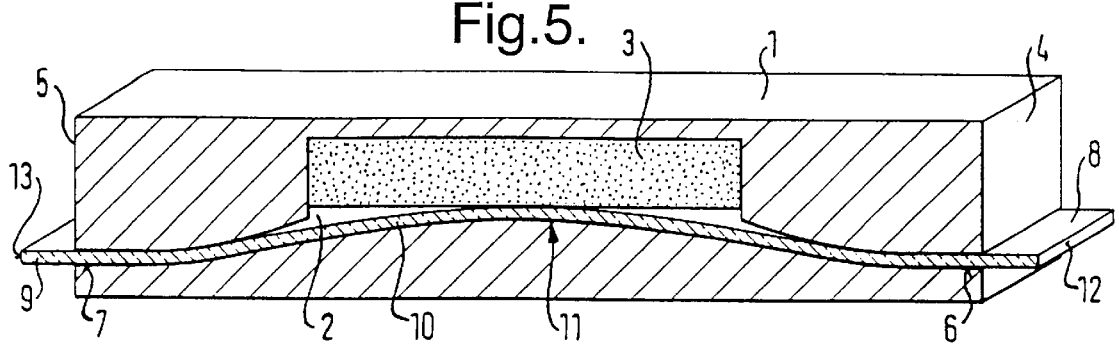
FIG. 5 is a further embodiment of the invention in the relaxed state.

In the embodiment in accordance with FIG. 5 the cavity 2 is designed in such a manner that the light conductor 10 is already slightly pre-bent in its relaxed position. In this the "relaxed position" is not necessarily to be understood to mean that the light conductor 10 is completely free of bending tension, but rather that the light conductor 10 is relaxed to such an extent as is possible through the constructional embodiment of the housing so that the free ends 8, 9 of the light conductor 10 are moved out of the housing 1 as far as possible.

Figure 6:
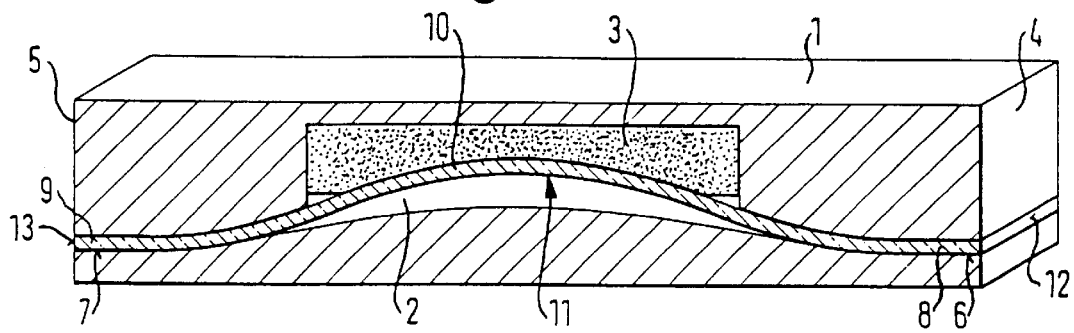
FIG. 6 is the apparatus in accordance with FIG. 5 in the biased state.

The position of the light conductor 10 which is biased in accordance with the invention is illustrated in FIG. 6. This biased position is for example achieved through a pressing together of the free ends 8, 9 of the light conductor 10.

Through this embodiment in accordance with FIGS. 5 and 6 a falling below a minimum bending radius of the light conductor 10 is prevented so that when the light conductor 10 is subjected to a bias force through the pressing together of its free ends 8, 9 a bending direction of the light conductor 10 is predetermined on the one hand, namely in the direction of the enlargement of the minimum bending radius, and on the other hand a compression of the light conductor 10 exclusively in the axial direction, without a lateral bending out, as can possibly occur in a linear arrangement of the light conductor 10 in accordance with FIG. 1, is reliably prevented.

Figure 7:
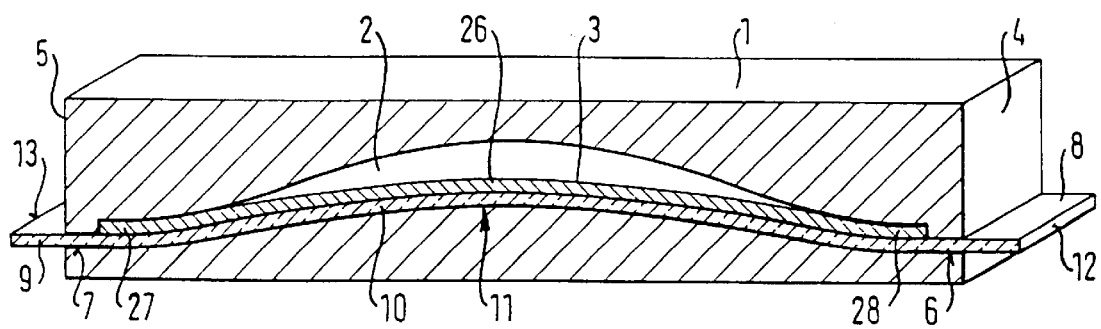
FIG. 7 is a further embodiment of the invention in the relaxed state.
Figure 8:
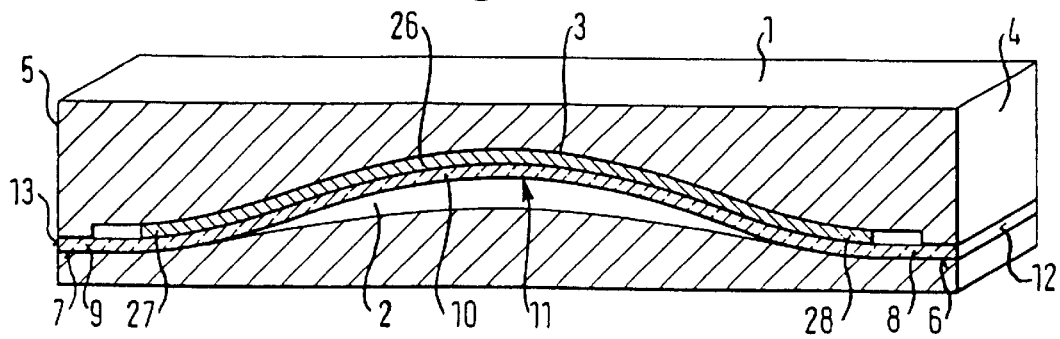
FIG. 8 is the apparatus in accordance with FIG. 7 in the biased state.

A further variant with a limitation of the minimum bending radius is shown in FIGS. 7 and 8. Here the elastic element 3 consists of a leaf spring 26, in particular of a steel spring, which extends along a portion of the light conductor 10 and parallel to the latter and in particular lies in contact with the latter. The ends 27, 28 of the leaf spring 26 are arranged in the cavity 2 so as to be substantially undisplaceable perpendicular to the light conductor 10 but however displaceable parallel to the light conductor 10 so that when the ends 8, 9 of the light conductor 10 are pressed together the leaf spring 26 is pressed by the light conductor 10 into the biased position shown in FIG. 8. In principle any desired suitable type of spring can be used instead of a leaf spring, for example a plate spring or a spiral spring. Also, instead of steel any other material having the required elasticity, for example also plastic, can be used as the spring material.

Whereas the light conductor 10 has in each case a rectangular cross-section in the figures, this cross-section can in principle be designed in any desired shape, for example circular. Essential is only that a shape of the light conductor 10 is chosen which can be varied, either through the action of a laterally acting force, for example via one or more push-buttons 15, or through forces acting axially on the end sides of the light conductor 10, in such a manner that the free ends of the light conductor 10 are retracted. Through a correspondingly elastic embodiment of the light conductor 10 or through the provision of elastic elements, for example in the form of the elastic material 3 or the leaf spring 26, the free ends of the light conductor 10 are then pressed outwardly for the production of a reliable optical connection under a bias force to the optical elements to be coupled on.

What is claimed is:

1. An optical connection unit comprising:
   a light conductor having a first end comprising a first coupling surface and an opposite second end comprising a second coupling surface, a coordinate system being defined as an X axis passing through said first and second ends and a Y axis orthogonal to said X axis, wherein a biasing force applied simultaneously toward each of said first and second ends causes said first and second ends to move toward each other and for said light conductor to bend in at least one direction parallel to said Y axis; and
   at least one elastic element disposed with respect to said Y axis contiguous with said light conductor;
       wherein when the biasing force is applied to said first and second ends, said at least one elastic element applies a force to said light conductor in a direction opposing the bending thereof.

2. The optical connection unit of claim 1, wherein said at least one elastic element is separate from and unconnected with said light conductor.

3. The optical connection unit of claim 2, further comprising a housing, wherein said at least one elastic element and said light conductor are arranged in said housing, wherein said housing has a first housing end having a first housing end opening and an opposite second housing opening having a second housing end opening, wherein said first end of said light conductor communicates with said first housing end opening, and wherein said second end of said light conductor communicates with said second housing end opening.

4. The optical connection unit of claim 3, further comprising an actuation member connected with said housing, wherein said actuation member selectively causes application of a force parallel to said Y axis so as to bend said light conductor in a direction parallel to said Y axis.

5. The optical connection unit of claim 3, wherein said elastic material is selected from a group of elastic materials comprising elastomers and silicones.

6. The optical connection unit of claim 3, wherein said at least one elastic element comprises a spring.

7. The optical connection unit of claim 3, wherein said light conductor is selected from a group of light transmissive materials comprising glasses and plastics.

8. The optical connection unit of claim 3, wherein said light conductor is pre-bent in a preselected direction of said Y axis, and wherein the bending of said light conductor in response to application of said biasing force increases the pre-bend in the preselected direction.

9. The optical connection unit of claim 8, wherein said at least one elastic element is disposed with respect to said preselected direction in adjacency with said light conductor.

10. The optical connection unit of claim 9, wherein said elastic material is selected from a group of elastic materials comprising elastomers and silicones.

11. The optical connection unit of claim 10, wherein said light conductor is selected from a group of light transmissive materials comprising glasses and plastics.

12. The optical connection of claim 9, wherein said at least one elastic element comprises a spring.

13. The optical connection unit of claim 12, wherein said light conductor is selected from a group of light transmissive materials comprising glasses and plastics.

14. An optical connection assembly comprising:
    a light conductor having a first end comprising a first coupling surface and an opposite second end comprising a second coupling surface, a coordinate system being defined as an X axis passing through said first and second ends and a Y axis orthogonal to said X axis, wherein a biasing force applied simultaneously toward each of said first and second ends causes said first and second ends to move toward each other and for said light conductor to bend in at least one direction parallel to said Y axis;
    at least one elastic element disposed with respect to said Y axis contiguous with said light conductor;
    a first optical device having a first optical device coupling surface; and
    a second optical device having a second optical device coupling surface;
        wherein when said first optical device coupling surface contacts said first coupling surface and said second optical device coupling surface contacts said second coupling surface the biasing force is thereupon applied to said first and second ends, whereupon said at least one elastic element applies a force to said light conductor in a direction opposing the bending thereof.

15. The optical connection assembly of claim 14, wherein said at least one elastic element is separate from and unconnected with said light conductor.

16. The optical connection assembly of claim 15, further comprising a housing, wherein said at least one elastic element and said light conductor are arranged in said housing, wherein said housing has a first housing end having a first housing end opening and an opposite second housing opening having a second housing end opening, wherein said first end of said light conductor communicates with said first housing end opening, and wherein said second end of said light conductor communicates with said second housing end opening.

17. The optical connection assembly of claim 16, further comprising an actuation member connected with said housing, wherein said actuation member selectively causes application of a force parallel to said Y axis so as to bend said light conductor in a direction parallel to said Y axis.

18. The optical connection assembly of claim 17, wherein said light conductor is pre-bent in a preselected direction of said Y axis, wherein the bending of said light conductor in response to application of said biasing force increases the pre-bend in the preselected direction, and wherein said at least one elastic element is disposed with respect to said preselected direction in adjacency with said light conductor.

19. An optical connection unit comprising:
  a light conductor having a first end comprising a first coupling surface and an opposite second end comprising a second coupling surface, a coordinate system being defined as an X axis passing through said first and second ends and a Y axis orthogonal to said X axis, wherein a biasing force applied simultaneously toward each of said first and second ends causes said first and second ends to move toward each other and for said light conductor to bend in at least one direction parallel to said Y axis;
  at least one elastic element disposed with respect to said Y axis contiguous with said light conductor; and
  a housing, wherein said at least one elastic element and said light conductor are arranged in said housing, wherein said housing has a first housing end having a first housing end opening and an opposite second housing opening having a second housing end opening, wherein said first end of said light conductor communicates with said first housing end opening, and wherein said second end of said light conductor communicates with said second housing end opening;
  wherein when the biasing force is applied to said first and second ends, said at least one elastic element applies a force to said light conductor in a direction opposing the bending thereof; and
  wherein said at least one elastic element is separate from and unconnected with said light conductor.

* * * * *